TUNABLE MAGNETRON

Filed June 3, 1949

2 Sheets-Sheet 1

INVENTOR
M. S. GLASS
BY [signature]
ATTORNEY

Aug. 15, 1961 M. S. GLASS 2,996,642

TUNABLE MAGNETRON

Filed June 3, 1949

2 Sheets-Sheet 2

INVENTOR
M. S. GLASS
BY [signature]
ATTORNEY

United States Patent Office 2,996,642

Patented Aug. 15, 1961

2,996,642
TUNABLE MAGNETRON

Myron S. Glass, West Orange, N.J., assignor to Bell Telephone Laboratories, Incorporated, New York, N.Y., a corporation of New York Filed June 3, 1949, Ser. No. 96,963
7 Claims. (Cl. 315—39.61)

This invention relates to electron discharge devices and more particularly to tunable multicavity type magnetrons.

In one type of tunable magnetron, such as disclosed in Patent 2,459,030, issued January 11, 1949, to H. C. Jonas et al. the anode comprises a conductive body having therein a plurality of parallel cavity resonator defining bores disposed about and coupled to a central aperture bore in which the cathode is positioned. Tuning is effected by the movement of conductive pins, one for each of the resonators, into or out of cavity resonator bores, thereby to vary the effective inductance of the resonators with a consequent adjustment of the resonant frequency. The greater the depth of insertion of the tuning pins into the resonator defining bores, the higher is the resonant frequency of the oscillatory system.

It has been found that in some such devices, at regions within the tuning range, marked degradation of performance obtains. Specifically, the power output may be substantially reduced and abrupt changes in frequency may occur.

One object of the invention is to improve the performance of tunable magnetrons. More specifically, one object of this invention is to eliminate spurious resonance effects in magnetrons of the type above described, whereby uniform tuning and optimum power output are obtained over a wide range of operating frequencies.

The aforenoted degradation of performance, it has been discovered, is associated with the tuning mechanism. More specifically, it has been determined that such degradation is attributable in large measure at least, to random contact between one or more of the tuning pins and the guide therefor, this guide being coupled electrically to the anode and having apertures through which the pins pass.

An electrical conductor, such as a tuning pin the device above described, grounded at one end and having its other end extending into free space or into and spaced from the walls of a hollow conductor exhibits resonance, the resonant frequency being that for which a quarter wavelength, or an odd multiple thereof, is equal to the length of the first conductor. In a magnetron of the type above discussed, each tuning pin, therefore, may exhibit resonance if it contacts with the guide, the frequency or frequencies of resonance being dependent upon the length of the pin between the point of contact and the end thereof toward the anode.

At such resonance frequency or frequencies, the line including the tuning pin extracts substantial energy from the oscillatory system of the magnetron, whereby the output of the magnetron is reduced accordingly. Furthermore, such resonance gives rise to voltage gradients which deleteriously affect the normal and desired distribution of gradients in the interaction region of the magnetron, whereby the stability of the oscillatory system is impaired or destroyed.

In accordance with one feature of this invention, spurious resonance effects of the nature above indicated are substantially eliminated. More specifically, in accordance with one feature of this invention, the tuning pins, guides therefor and anode are constructed and arranged so that upon contact between any pin and the guide, the coupling between the resonant pin structure and the oscillatory system is so small that the energy extracted from the system is substantially negligible and the resonant pin structure cannot set up undesirable voltage gradients in the interaction space.

In one illustrative construction, the tuning pins and guide are constructed and arranged so that each pin is grounded to the guide at a region such that the free length of the pin at the position at which it just emerges from the guide is substantially equal to a quarter wavelength of about the lowest frequency in the desired tuning range of the magnetron. As the pin emerges and enters the respective cavity resonator bore, its effective length increases and approaches a half wavelength of the operating frequency. Thus, the line of which the pin forms a part, becomes non-resonant at the frequency noted and others in the desired tuning range.

In accordance with another feature of this invention, the free space between the guide and the anode is substantially minimized whereby the inductive loading on the pins is reduced and the coupling thereof to the fields in the oscillating system is correspondingly reduced.

The invention and the above-noted and other features thereof will be understood more clearly and fully from the following detailed description with reference to the accompanying drawing, in which.

Figure 1:
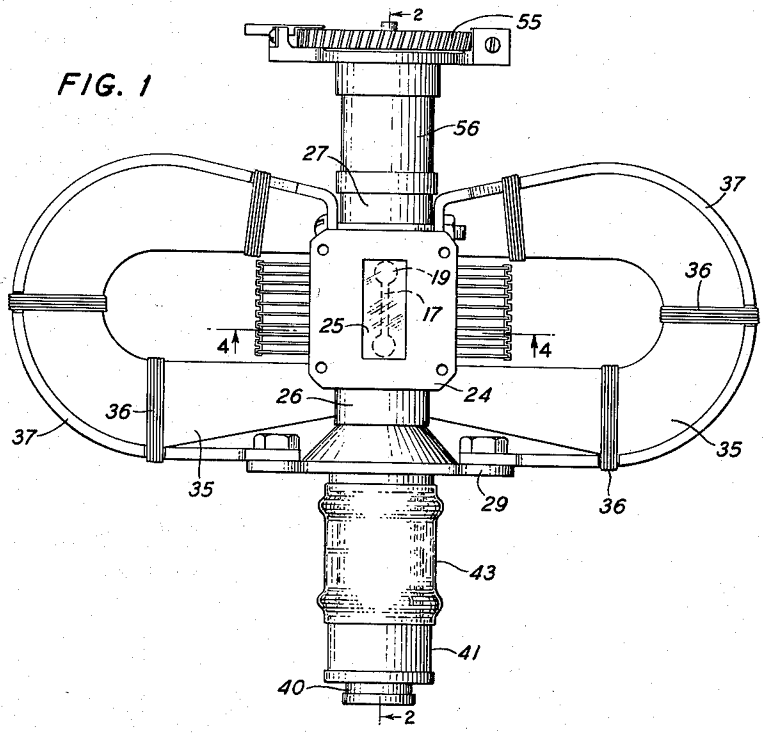
FIG. 1 is an elevational view of a magnetron illustrative of one embodiment of this invention.
Figure 4:
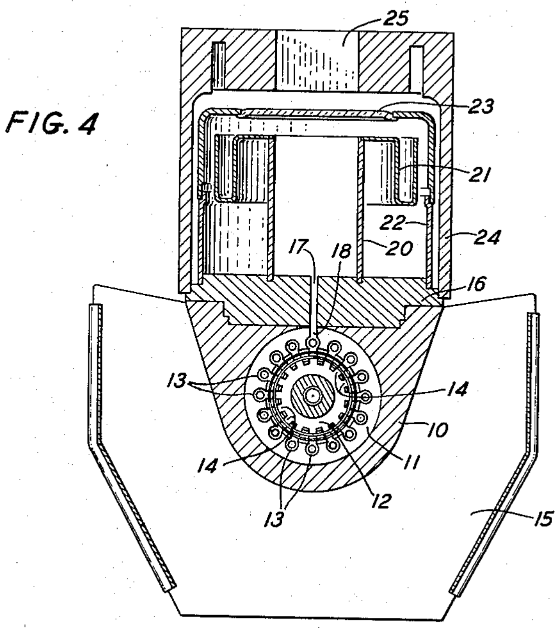
FIG. 4 is a sectional view taken along plane 4—4 of FIG. 1.
Figures 2, 3:
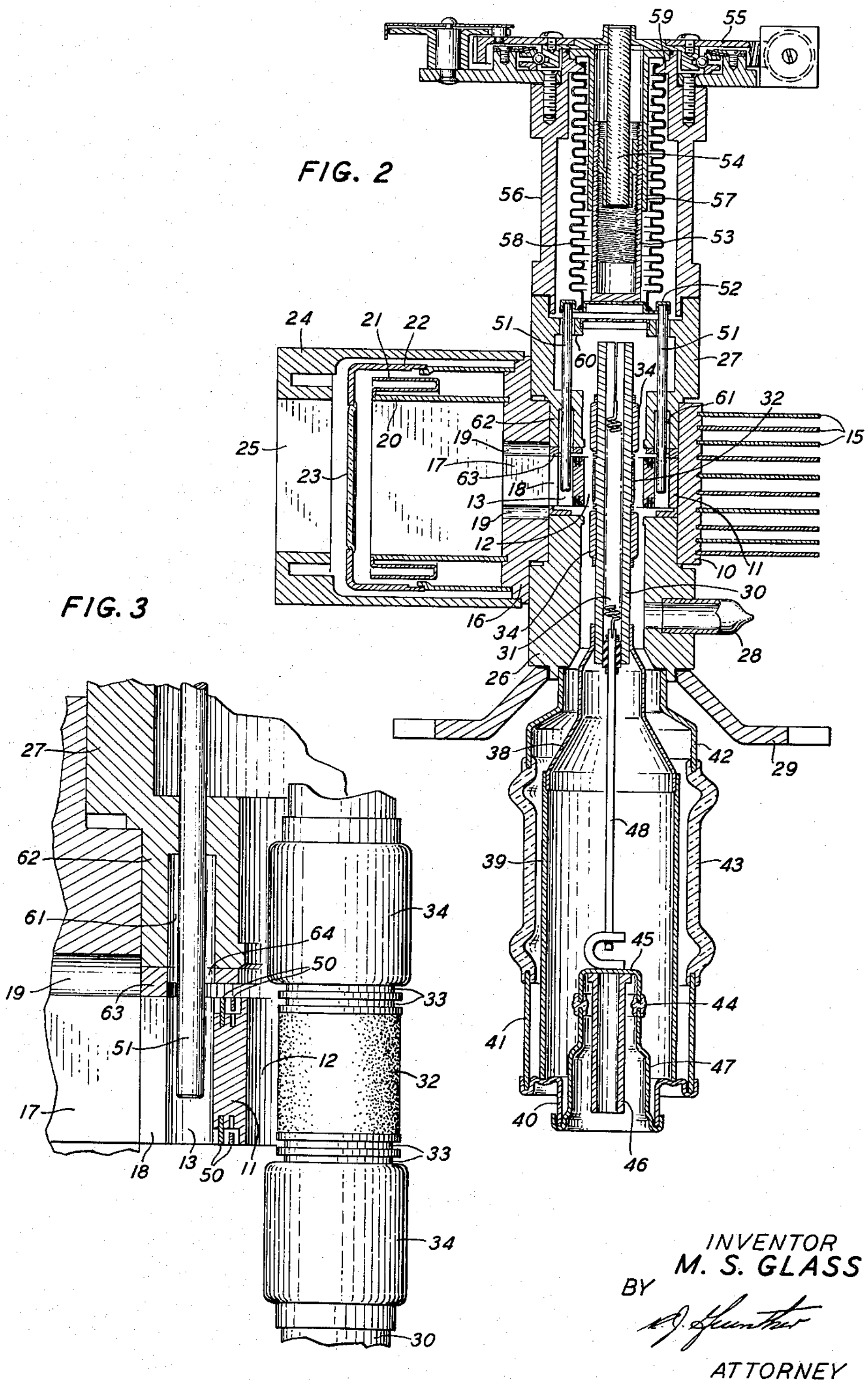
FIG. 2 is a sectional view of the magnetron taken along plane 2—2 of FIG. 1 and with the magnets omitted.
FIG. 3 is an enlarged detail view, partly in section, illustrating the relation of one of the cavity resonators, the associated tuning pin and the guide therefor.

Referring now to the drawing, the magnetron therein illustrated comprises a metallic, non-magnetic body 10, for example of copper, having therein an anode 11. As shown in FIGS. 2 and 4, the anode has therein an axial aperture or bore 12 and a plurality of cavity resonator defining bores 13 equally spaced in circular array about the bore 12 and each communicating therewith by a respective radial slot 14. The anode is provided at opposite ends with coaxially metallic mode locking straps 50 positioned in circular recesses in the anode, as shown clearly in FIG. 3. Each strap is connected only to alternate anode segments, each of the straps at each end being connected to a respective group of alternate segments.

Secured to the body 10 are a plurality of heat radiating fins or vanes 15. Also secured to the body and forming a hermetic seal therewith is a metallic, e.g., copper, platform or plate 16 having therein a dumbbell shaped slot 17 which, as shown in FIGS. 3 and 4, is aligned with a slot 18 extending from one of the resonator defining bores 13 and has its circular end portions 19 opposite the ends of the anode.

The platform or plate 16 mounts a wave guide section through which energy from the oscillatory system of the magnetron may be transmitted to an external wave guide. This section comprises an inner rectangular metallic member 20 axially aligned with the slot 17 and provided at its outer end with a folded or channel shaped choke joint defining surround 21. It comprises also a metallic outer member 22 sealed hermetically to the platform 16 and having hermetically sealed thereto a circular window 23 axially aligned with the inner member 20. Also mounted upon the platform 16 is a metallic coupler 24 having therein an aperture 25 aligned axially with the inner member 20.

A pair of hollow cylindrical pole-pieces 26 and 27 are sealed hermetically to the body 10 and platform 16, the pole-piece 26 having an exhaust tubulature 28 thereon and a bracket 29 affixed thereto. Supported from the pole-piece 26 is a unitary mount which comprises a cylindrical cathode member or sleeve 30 axially disposed within the bore 12 and having a heater filament 31 therein. The outer surface portion of the sleeve 30 opposite the inner faces of the anode sections has thereon an electron emissive coating 32. To prevent migration of the coating material along the cathode, the sleeve 30 is provided with grooves 33 just beyond the coating, as illustrated most clearly in FIG. 3. Fixed upon the sleeve 30 just beyond the grooves 33 are a pair of magnetic collars 34 which serve to increase and shape the magnetic field in the anode-cathode region. This field, which is parallel to the cathode, is produced by a pair of horseshoe magnets 35 banded, as indicated at 36, to brackets 37 and having their pole faces bearing against the pole-pieces 26 and 27.

The cathode member or sleeve 30 is secured to and mounted by a generally frusto-conical metallic member 38 which is joined to one end of a metallic cylinder 39 in turn joined at its other end to a metallic cap 40. The cap 40 is mounted from the pole-piece 26 by a cylindrical structure having metallic end sections 41 and 42 sealed to the cap 40 and pole-piece 26, respectively, and sealed also to an intermediate vitreous section 43. Supported from the cap 40 and insulated therefrom by a vitreous ring 44 is a second cap 45 from which a cylindrical conductor 46 depends, the conductor 46 and surrounding cylinder 47 constituting the terminals of a coaxial jack through which connection to the cathode and heater filament 31 may be established. One end of the heater filament is connected to the cathode member 30; the other end thereof is connected to the cap 45 by a rigid conductor 48.

The other pole-piece 27 supports a tuning mechanism for controllably varying the operating frequency of the magnetron. This mechanism includes a plurality of metallic pins 51, one for each of the bores 13 and insertable axially thereinto, mounted by a metallic carrier 52 which, in turn, is mounted from an internally threaded reciprocable shaft 53. Axial displacement of the shaft 53 is effected by a stem 54 threaded thereto and rotatable by a worm and gear drive 55. The latter is supported by a cylinder 56 hermetically joined to the pole-piece 27 and mounting a sleeve 57 in which the shaft 53 is slidably fitted. A bellows 58 has one end sealed hermetically to the carrier 52 and its other end sealed similarly to a flange 59 on the cylinder 56.

The tuning pins 51 extend through oversize apertures in a flange 60 on the pole-piece 27 and through oversize cylindrical recesses 61 in a thickened portion 62 of this pole-piece. Also, these pins extend through apertures in one end of this thickened portion so as to be electrically connected thereto. For example, the pins may be fitted slidably in these apertures and contact the walls thereof. In another construction, the pins may be spaced slightly from these walls, for example of the order of two mils, the capacitance between the pins and walls providing a low impedance, high frequency connection.

When the stem 54 is rotated by the worm and gear drive 55, the shaft 53 is displaced axially thereby to advance or retract the tuning pins 51 to vary the depth of penetration or insertion thereof into the resonator defining bores 13. Advantageously, the elements are correlated so that the pins may be withdrawn completely from the bores or inserted thereinto a depth of about three-fourths the bore length. Insertion of the pins into the bores alters the inductance of the oscillatory system of the magnetron whereby the operating frequency is increased proportionately to the depth of pin insertion.

As has been indicated heretofore, the tuning pins together with the bounding walls of the recesses 61 constitute a coaxial line which might extract energy from the oscillating field of the magnetron and also introduce spurious resonances in the tuning range. However, in accordance with one feature of this invention, such deleterious effects are prevented. Specifically, the depth of the recesses 61 is made such that at the lowest desired operating frequency, e.g., when the tuning pins are removed from the bores 13, the effective length of the pins measured from the base of the recesses 61 is substantially equal to one-quarter wavelength of this frequency. Thus, as the pins are advanced and enter the bores 13, the coaxial lines of which they form a part are non-resonant at the operating frequency of the magnetron, the effective length of the lines increasing and approaching a half wavelength of the operating frequency as the depth of insertion of the pins into the bores is increased. Hence, energy abstracted by the lines is minimized and these lines cannot introduce substantial spurious resonances in the oscillating system of the magnetron.

In magnetrons of the kind and general construction described, the several resonators are linked by fields in the end spaces, one of which spaces is between the pole-piece 27 and the anode. It has been found that these fields may be of the correct direction to excite the coaxial lines of which the pins are parts. Also the non-uniform voltage distribution along the anode resonators caused by the mode locking straps 50 may produce currents that will excite the coaxial lines including the tuning pins. In accordance with another feature of this invention, possibilities of such excitation are reduced.

Specifically, as illustrated in FIGS. 2 and 3, the end space volume is reduced by an annular metallic filler member 63 having oversize apertures 64 through which the tuning pins 51 extend. This member reduces the inductive loading of the pins and thus reduces the effective length of the coaxial lines including the pins whereby the resonance frequency of these lines is decreased.

It will be appreciated from the foregoing, that in devices constructed in accordance with this invention the resonance of the pin-recess lines is such that throughout the tuning range of the magnetron, the power which is lost to the lines is minimized and substantial spurious resonance effects are prevented.

Although a specific embodiment of this invention has been shown and described, it will be understood that various modifications may be made therein without departing from the scope and spirit of this invention.

What is claimed is:

1. An electron discharge device comprising an anode having therein an aperture, a cavity resonator bore laterally adjacent said aperture and a slot coupling said bore and said aperture, a cathode in said aperture, and means for tuning the resonator over a range of frequencies, said tuning means comprising a tuning pin axially insertable into said bore, means coupled to said pin for adjustably moving it into and out of said bore and means terminating the coaxial line defined by said pin in said bore in a short circuit at a distance from said anode substantially equal to a quarter wavelength at the low frequency end of said range.

2. An electron discharge device comprising an anode having therein an aperture, a cavity resonator bore laterally adjacent said aperture and a slot coupling said bore and said aperture, a cathode in said aperture, a conductive guide opposite one end of said anode and having therein a recess axially aligned with said bore, a tuning pin insertable into said bore and recess, and means for adjustably displacing said pin axially to move it into or out of said bore, said pin contacting said guide only at the base of said recess, and said base being spaced from said end of said anode a distance substantially equal to a quarter wavelength of the resonant frequency of said bore when said pin is removed therefrom.

3. A magnetron comprising an anode having therein an aperture, a cavity resonator defining bore laterally adjacent said aperture and a slot coupling said aperture and said bore, a cathode in said aperture, means for producing a magnetic field parallel to said cathode including a pole-piece opposite one end of said anode and having therein a recess axially aligned with said bore, means for tuning the cavity resonator over a prescribed range of frequencies, said tuning means comprising a pin aligned with said bore and recess and axially insertable thereinto and means coupled to said pin for displacing it axially to vary the depth of insertion thereof into said bore, and means short-circuiting said pin to said pole-piece at a distance from said one end of said anode substantially equal to a quarter wavelength of the lowest frequency in said range of frequencies.

4. An electron discharge device comprising an anode having therein an aperture and a plurality of cavity resonator bores disposed about said aperture and in lateral communication therewith, a cathode in said aperture, means for tuning the cavity resonators over a prescribed range of frequencies, said tuning means comprising a plurality of tuning pins, one for each bore and axially insertable thereinto and means for moving said pins simultaneously to vary the depth of insertion thereof into said bores, and means for short-circuiting the coaxial line defined by said pins in said bores at a region such that when said pins are at the position corresponding to the lowest frequency in said range the effective length of each pin is substantially a quarter wavelength of said frequency.

5. An electron discharge device comprising an anode having therein an aperture and a plurality of cavity resonator bores disposed about said aperture and in lateral communication therewith, a cathode in said aperture, means for tuning the cavity resonators over a prescribed range of frequencies, said tuning means comprising a plurality of tuning pins, one for each bore and axially insertable thereinto, and means operably connected to said pins for moving said pins simultaneously to vary the depth of insertion thereof into said bores, a conductive member opposite and spaced from one end of said anode and having therein recesses through which said pins extend, each recess being opposite a respective one of said bores and having its open end toward said one end of said anode, the bases of said recesses being spaced from said one end a distance substantially equal to a quarter wavelength of the lowest frequency in said range, and each pin contacting said conductive member at the base of the respective recess.

6. An electron discharge device in accordance with claim 5 comprising filler means in the space between said conductive member and said one end of said anode for reducing the coupling between said pins and the inter-resonator fields in said space.

7. A magnetron comprising an anode having therein an aperture, a plurality of cavity resonator bores disposed about and parallel to said aperture and laterally adjacent thereto and a plurality of slots each extending between said aperture and a respective bore, a cathode in said aperture, means for producing a magnetic field adjacent and parallel to said cathode including a pole-piece opposite one end of said anode, said pole-piece having therein a plurality of recesses one axially aligned with each of said bores and having its open end theretoward, a plurality of tuning pins each axially movable in a corresponding recess and associated bore, and means for moving said pins axially to vary the extent of insertion thereof into said bores, thereby to tune the resonators over a preassigned range of frequencies, each of said pins contacting with said pole-piece only at a distance from said one end of said anode substantially equal to a quarter wavelength at the low frequency end of said range.

References Cited in the file of this patent

UNITED STATES PATENTS

| | | |
|---|---|---|
| 2,433,481 | Retherford | Dec. 30, 1947 |
| 2,450,619 | Sonkin | Oct. 5, 1948 |
| 2,459,030 | Jonas et al. | Jan. 11, 1949 |
| 2,508,576 | Kusch | May 23, 1950 |
| 2,527,699 | Bowen et al. | Oct. 31, 1950 |
| 2,529,950 | Kather | Nov. 14, 1950 |